United States Patent Office 2,728,040
Patented Dec. 20, 1955

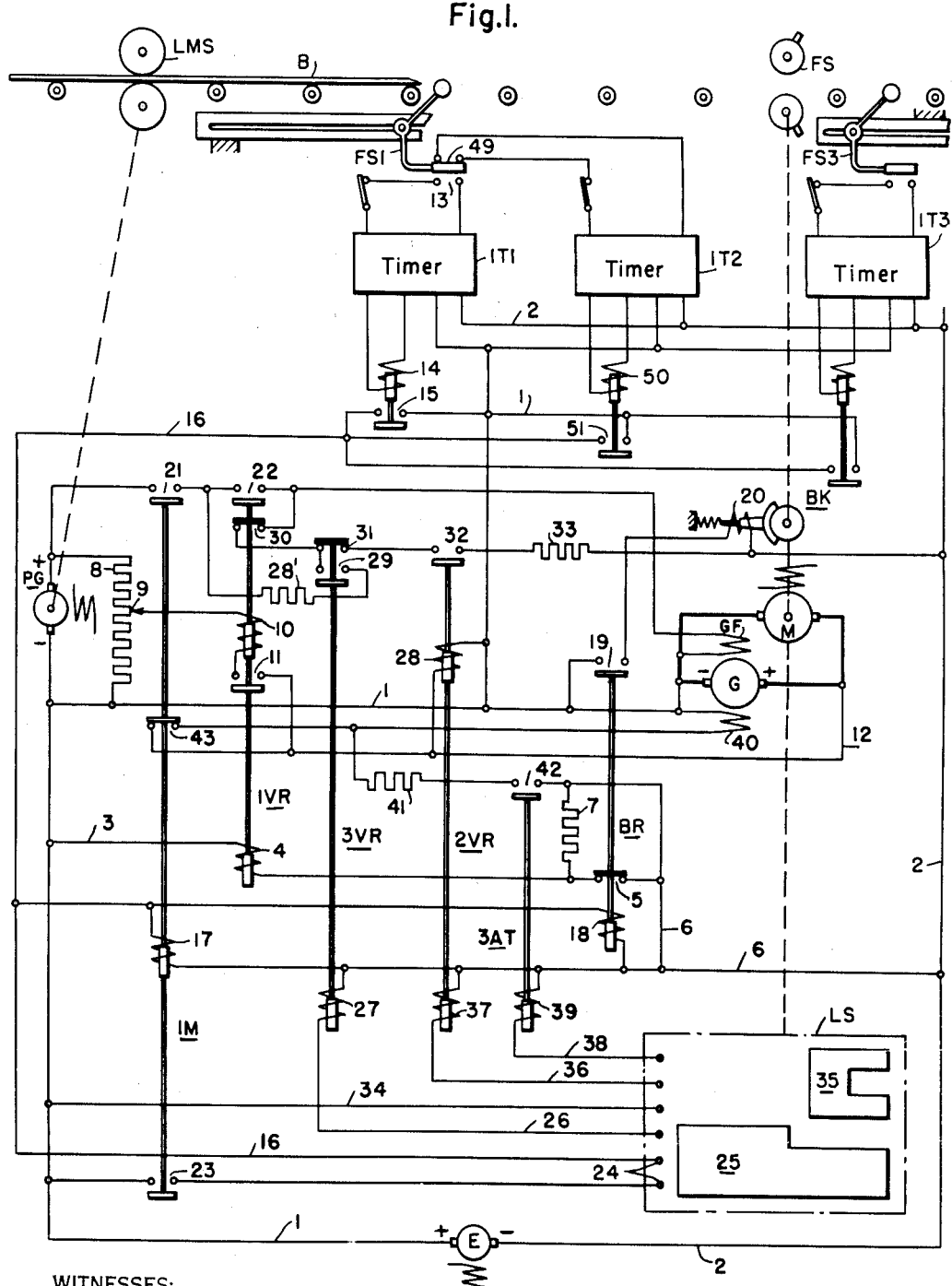

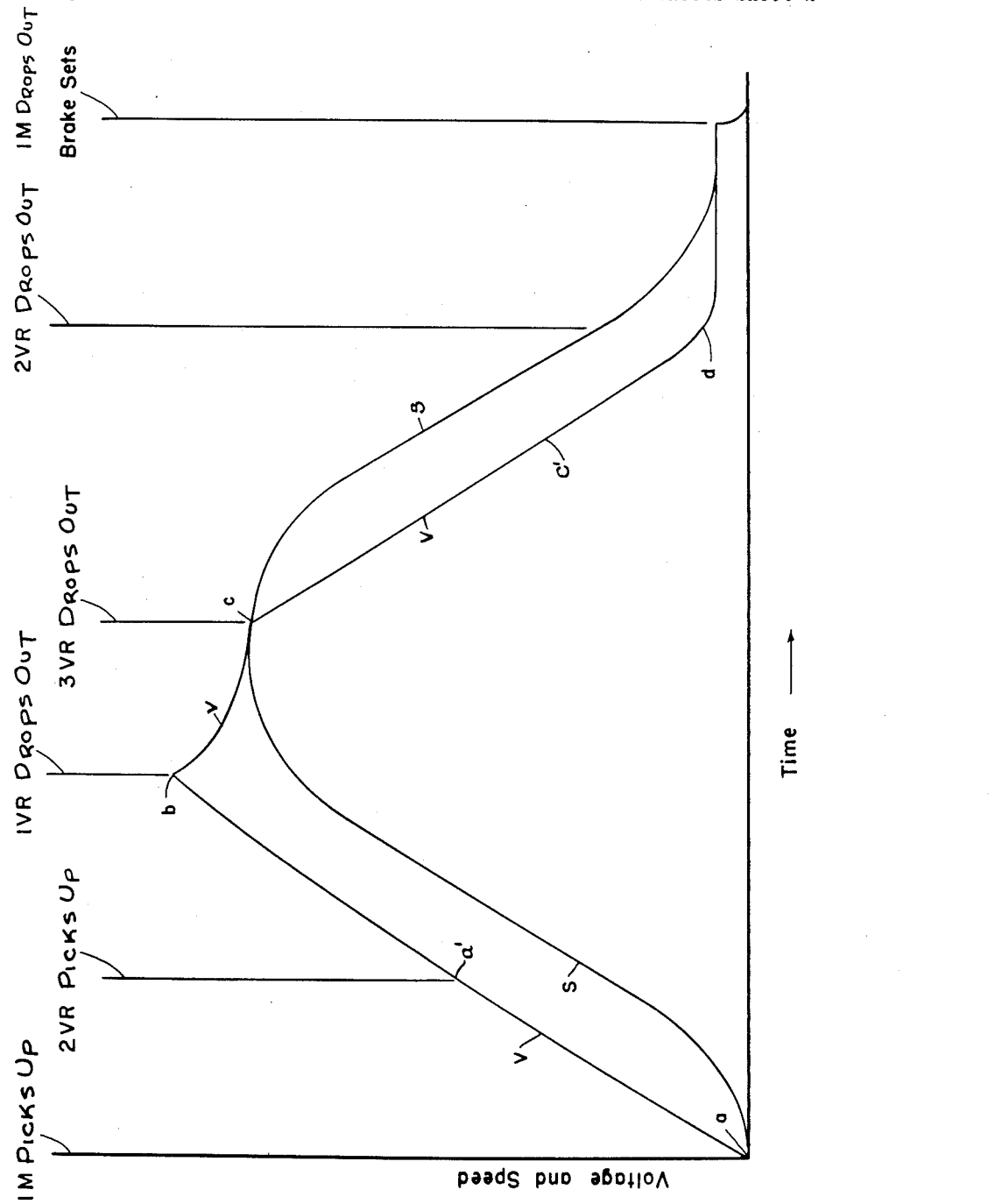

2,728,040

CONTROL SYSTEM FOR FLYING CROP SHEAR MOTOR

William T. Hunt, Jr., Williamsville, and Charlton H. Storey, Jr., Buffalo, N. Y., assignors to Westinghouse Electric Corporation, East Pittsburgh, Pa., a corporation of Pennsylvania Application May 8, 1951, Serial No. 225,186

12 Claims. (Cl. 318—275)

Our invention relates to motor control systems and, more particularly, to motor control systems of the Ward-Leonard type for effecting rapid acceleration and deceleration of the motor coupled to the generator.

Generally stated, it is an object of our invention to provide a system of control for a motor operating a machine such as a flying shear, which system shall be simple and accomplish the desired results.

It is a more specific object of our invention to provide for the rapid acceleration of a motor from rest to full speed, maintaining the motor at full speed for a relatively short time interval and decelerating the motor to a position of rest all within one revolution of the motor armature.

In the operation of flying shears to crop the front and rear ends of a billet passing from the last mill stand to the flying shear, it is important that the knives of the flying shear, at the time the cutting operation is made, move at substantially the speed of the material moving through the flying shears.

Apparatus for operating the flying shears from a position of rest to the speed of material passing through the shear and back to a position of rest all within one rotation of the flying shear are known in the prior art; however, such systems of control have not been reliable nor have they provided the cutter operation desired.

For this type of shear operation, the shear must be started and accelerated to such a speed that the knife speed matches or slightly exceeds the speed of the bar, or billet, to be cut, or cropped. After the cut has been made, the shear must be stopped without making a second cut. When the shear is directly coupled to the shear motor, the operation must be accomplished in one revolution of the shear motor. In previous practice, voltage regulators have been utilized to build up the generator voltage and maintain it matched proportionate to the strip speed. As the total time for making one revolution is approximately .6 second, it is apparent that a speed of response is expected of the voltage regulators now known in the trade which such regulators are not designed to produce. The time within which the generator is to build up its voltage from zero voltage to full voltage is approximately .2 second. The apparatus known heretofore in the trade could not anywhere approach the required performance.

With our system of control, we so interconnect the field winding of the main generator with a pilot generator, producing a voltage output proportional to the last mill stand speed and the output voltage of a constant-potential exciter, that the proper rapid sequence of operation required of the motor is obtained.

It is one broad object of our invention to accelerate a motor from rest to full speed during a fraction of a single rotation of the armature, maintain the armature at full speed for a small fraction of one armature rotation, and decelerate the motor armature to a position of rest for the remaining fraction of one armature revolution.

The objects hereinbefore recited are merely illustrative of the objects of our invention. Other objects will become more apparent from a study of the following specification and the accompanying drawings in which:

Figure 1 is a diagrammatic showing of our system of control as applied to a motor operating a flying shear, and Figure 2 shows some curves illustrating changes in generator voltage during one cycle of operation and the changes in the motor speed during one cycle of operation.

Referring to Figure 1, LMS represents the last mill stand from which the billet B is transmitted to the flying shears FS operated by the motor M. This motor M has its armature connected in a loop circuit with the armature of the main generator G having the two field windings GF and 40. The generator field winding GF has characteristics such that when a voltage is applied to it of rated value, the excitation will build up extremely rapidly.

The pilot generator PG is driven from the last mill stand and, thus, has an output voltage proportional to the speed of the last mill stand.

For further control purposes, we provide the exciter E, which has an output voltage of a constant value, to excite the control apparatus and also to excite the field windings GF and 40 during an appropriate time of a cycle of operation.

To start the motor M at the proper time, we utilize a flag switch FS1 for energizing an electronic timer 1T1.

For a proper understanding of the operation of our device, a study of a typical cycle of operation will be most helpful. Assuming that the mill is in operation, that the field windings of the motor M, of the pilot generator PG, and of the exciter E are fully excited, that the exciter E and the main generator G are operating at their full speed from suitable prime movers (not shown), and that the circuit connections of the control circuit are as shown, then an energized circuit is established from the exciter E through conductor 1 to the electronic timers 1T1, 1T2 and 1T3, all connected in parallel, through conductor 2 to the other terminal of the exciter. The electronic timers, which include heating elements which must be hot for proper operation, are thus ready for duty when later called upon for operation. A second circuit is established from the positively energized conductor 1 through conductor 3, actuating coil 4 of relay 1VR, back contacts 5 of the brake relay BR, and conductor 6 to the negatively energized conductor 2. Operation of this relay 1VR effects the closing of contacts 11 and 22 and the opening of contacts 30. Potentiometer resistor 8, it will be noted, is in an energized circuit that may be traced from the positive terminal of the pilot generator PG through the potentiometer resistor 8 to the negative terminal of the pilot generator.

It will be noted that the negative terminal of the pilot generator G is directly connected to the positive terminal of the exciter E, namely, conductor 1, and that this conductor is directly connected to the negative terminal of the main generator G and the lower and upper terminals, respectively, of the field windings GF and 40, respectively.

After contacts 11 are closed, a circuit is established from the adjustable junction 9 through the holding coil 10 of relay 1VR, contacts 11, to the conductor 12 connected to the positive terminal of the main generator G. In view of the connection of coil 10 just explained, it is apparent that this coil 10 is energized proportional to the voltage difference between the voltage of the pilot generator PG and the voltage of the main generator G.

The relay 2VR has a coil 28 connected directly across the armature terminals of the main generator G. This coil is so selected that it will actuate relay 2VR to close contacts 32 when the voltage of the main generator has risen to some value, as $a'$ (Fig. 2).

If the billet B moves to operate the flag switch FS1, the contacts 13 are closed, and, in consequence, the actuating coil 14 of the timer is operated to close contacts 15 whereupon a circuit is established from conductor 1 through contacts 15, conductor 16, actuating coil 17 of the field contactor 1M, and actuating coil 18 of the braking relay connected in parallel to coil 17 to the negatively energized conductor 6.

Operation of the brake relay BR causes the closing of contacts 19 and the opening of contacts 5, whereupon a circuit is established from conductor 1 through contacts 19, brake coil 20 to the conductor 2. The brake BK is thus operated to free the shaft of motor M. The opening of contacts 5 substantially deenergizes coil 4 by the insertion of resistor 7 in series with coil 4, but relay 1VR remains actuated through the action of coil 10, which coil 10 at this stage is energized by the full voltage of the pilot generator PG because the main generator voltage is still zero.

At the same instant that the brake relay operates, field contactor 1M operates to close contacts 21 and 23 and to open contacts 43. The closure of contacts 21 establishes a circuit from the positive terminal of the pilot generator PG through contacts 21 of relay 1M and contacts 22 of relay 1VR, the field winding GF, to the conductor 1. This instant is represented by point $a$ on Figure 2, namely, the starting instant for motor M. The field winding GF is designed so that its flux will be built up very rapidly. The generator voltage rises in an exponential manner, but due to the high forcing of the field, the voltage rises from point $a$ to point $b$ substantially along a straight line as indicated by curve V. The second curve designated S represents motor speed. It will be noted that the motor speed, though lagging slightly behind the voltage curve, rises very rapidly with the rise in voltage of the main generator G.

Since the limit switch LS is directly coupled to the motor M, it is apparent that the instant the motor M starts operating through a relatively small angular movement, a circuit is established from conductor 1, through contacts 23, contacts 24 bridged by the limit switch segment 25 to conductor 16. Since this circuit is in parallel to contacts 15 of the timer 1T1, it is apparent that the energization of the field contactor 1M is thus now independent of contacts 15, which contacts in practice are only closed long enough to start the operation. A second circuit is established from energized switch segment 25, conductor 26, actuating coil 27 of the relay 3VR, to the negative conductor 6. Relay 3VR thus operates to close the contacts 29 and open its contacts 31. This operation at this instant does not produce any change of excitation in field winding GF but sets up circuit conditions so that the field excitation of field winding GF may be rapidly changed when relay 1VR drops out.

As the generator voltage rises, the voltage of the generator G will be impressed on coil 10 in opposition to the voltage impressed upon this coil 10 by the pilot generator PG. The selection of the characteristics of coil 10 is so made that at point $b$ of curve V, 1VR drops out whereupon the field winding GF is energized from the pilot generator PG through contacts 21, resistor 28', contacts 29 and 30, field winding GF, to conductor 1. The generator voltage is thus decreased from point $b$ to point $c$. During the interval that the voltage of the generator G is decreased from $b$ to $c$, and for a short time thereafter, the speed of the motor is very nearly constant and the selection of the voltage changes is so made that the speed of the motor is substantially such that the speed of the flying shear matches the speed of the material being cut.

At point $c$, the motor M will have moved through an angle such that the circuit for coil 27 is interrupted at the limit switch segment 25 whereupon the pilot generator PG is disconnected from the field winding GF at contacts 29, and contacts 31 are closed.

The instant contacts 31 are closed, a circuit is established from the positive terminal of exciter E through conductor 1, field winding GF, contacts 30, 31 and 32, resistor 33, and conductor 2 to the negative terminal of exciter E. The field winding GF is thus energized with reverse polarity and the generator voltage thus decreases very rapidly from point $c$ to point $d$.

While the voltage of the generator decreases from point $c$ to point $d$, the coil 28 becomes sufficiently deenergized that relay 2VR would normally drop out, as at point $c'$. However, the actuated position of relay 2VR is maintained by a circuit that may be traced from conductor 1 through conductor 34, limit switch segment 35, conductor 36, and the second actuating coil 37 of relay 2VR to the conductor 6. The relay 2VR thus remains in its actuated position until the contact finger on conductor 36 moves off of the controller segment 35. This occurs at point $d$.

At the same time that coil 37 is energized, another circuit is established from the controller segment 35 through conductor 38 and actuating coil 39 to conductor 6. The energization of coil 39 effects the operation of the relay 3AT to close contacts 42. The closure of contacts 42 establishes a circuit for field winding 40 from the conductor 1 through field winding 40, resistor 41, contacts 42, to the conductor 6. The field winding 40 is so wound that when it becomes energized, it produces a flux in the same sense as produced by the pilot generator on field GF; however, the energization, by reason of the proper selection of the characteristics of resistor 41, is such that only a very low generator voltage is produced to thus provide a creeping speed for the motor M when field winding GF becomes open circuited.

At point $d$, namely, prior to an actual reversal of the current in the field winding GF, the energizing circuit for coil 37 is interrupted at segment 35 with the result that the relay 2VR drops out to open contacts 32. The field winding GF is thus disconnected from the exciter E, and the field winding 40, providing a low excitation, effects a creeping speed for motor M to bring the flying shear into the original position. When the flying shear is in its original position, the limit switch LS opens all the circuits at its contact fingers. This means that the coils 17 18 are deenergized, and, as a result, contacts 43 close whereupon the field winding 40 is connected in a circuit which may be traced from the positive terminal of generator G through conductor 12, contacts 43, field winding 40, to the negative terminal of the generator G. The polarity on field winding 40 is thus reversed, and the residual magnetism of generator G is dissipated.

The deenergization of coil 18 opens the circuit for the actuating coil 20 of the brake BK at contacts 19, and both the flying shear and the limit switch are locked into their original position.

It will be noted that the flag switch FS1 is also provided with back contacts 49 which close the circuit for electronic timer 1T2 when the tail end of the billet passes the flag switch FS1. The adjustment is such that the actuating coil 50 of this electronic timer 1T2 operates to close contacts 51 when the tail end of the billet B effects a closing of contacts 49. The operating cycle is thus repeated since contacts 51 are in parallel to contacts 15.

From the foregoing it is apparent that our control by the successive energization of the relays 14 and 50 also provides for squaring of the leading and lagging end of the billets.

The time constants of the electronic timers are adjustable so that the moment of starting the cut can be changed. The length of the crop may thus be altered at will.

Electronic timer 1T3 actuated by flag switch FS3 represents still another means for starting the operating cycle and can be utilized to cut predetermined lengths of material by means of the flying shear by suitable adjustment of the flag switches with respect to each other.

While we have shown our invention in connection with a particular application, namely, as applied to a flying shear, our control is, however, not limited to this application but includes others falling within the spirit of our invention.

We claim as our invention:

1. In an electric system of control, in combination, a motor having an armature for driving a load, a main generator, said motor and generator being connected in a loop circuit, said generator having a field winding with characteristics so that its excitation may be built up rapidly, a second field winding for the main generator, a pilot generator having an output voltage proportional to the speed of a machine, an exciter providing a source of constant potential, means for connecting the pilot generator to the generator field winding to rapidly increase the field excitation and thus accelerate the motor, means responsive to a selected rise in voltage of the main generator for decreasing the voltage applied to the field winding to cause the motor to operate at constant speed, means responsive to a selected angular movement of the motor for connecting the field winding of the main generator to the exciter in reverse polarity to thus rapidly decrease the field excitation, means responsive to a further selected angular movement of the motor armature for so connecting the exciter to the field winding to reverse the excitation thereof, means for limiting the current flow in the field winding to thus provide a creeping speed for the motor, and means for substantially simultaneously connecting the second field winding to the main generator to kill its residual flux and for locking the motor armature in fixed position at a selected angular movement of the armature.

2. In an electric system of control, in combination, a motor and main generator connected in a loop circuit, a pilot generator excited at a selected value and driven at a speed in proportion to the speed of a machine to thus have a voltage output proportional to its armature speed, a low-reactance low-resistance field winding for the main generator, whereby the excitation of the main generator may be built up in a relatively very short time interval, means for connecting the main generator field winding through a low impedance circuit to the armature of the pilot generator to thus rapidly build up the main generator excitation, means responsive to a selected rise in main generator voltage for connecting the main generator field winding through a relatively higher impedance circuit to excite the main generator at a value to cause the motor to operate at a speed proportional to the speed of the pilot generator, an exciter providing a constant potential reference voltage, means responsive to a selected angular movement of the motor armature at the speed of the pilot generator for disconnecting the main generator field from the pilot generator and connecting it to the exciter to rapidly decrease the excitation to a selected low value, means for briefly holding the excitation at the low value to provide a creeping speed for the motor, and means operable at an instant when the motor armature is in a given position to lock the motor armature in position.

3. In an electric system of control, in combination, a motor and main generator connected in a loop circuit, a pilot generator excited at a selected value and driven at a speed in proportion to the speed of a machine to thus have a voltage output proportional to its armature speed, a low-reactance low-resistance field winding for the main generator, whereby the excitation of the main generator may be built up in a relatively very short time interval, a second field winding for the generator, means for connecting the main generator field winding through a low impedance circuit, to the armature of the pilot generator to thus rapidly build up the main generator excitation, means responsive to a selected rise in main generator voltage for connecting the main generator field winding through a relatively higher impedance circuit to excite the main generator at a value to cause the motor to operate at a speed proportional to the speed of the pilot generator, an exciter providing a constant potential reference voltage, means responsive to a selected angular movement of the motor armature at the speed of the pilot generator for disconnecting the main generator field winding from the pilot generator and connecting it to the exciter to rapidly decrease the excitation to a selected low value, means for briefly holding the excitation at the low value to provide a creeping speed for the motor, means operable at an instant when the motor armature is in a given position to lock the motor armature in position, means for disconnecting the field winding from the exciter, and means for connecting the second field winding to the main generator to kill the residual flux.

4. In an electric system of control, in combination, a motor having a field winding excited at a selected value and having an armature, a generator having a field winding with characteristics such that the generator voltage may be built up rapidly when the generator field is excited, said generator having an armature connected in a loop circuit with the armature of the motor, an exciter for effecting rapid excitation of the generator field, a second exciter, said two exciters having their negative and positive armature terminals connected together and to one terminal of the generator field winding, means for connecting the positive terminal of the first exciter to the other terminal of the generator field winding to thus effect the starting and rapid acceleration of the motor, means responsive to a selected rise in generator voltage to decrease the effective voltage applied to the generator field winding, means responsive to a selected angular movement of the motor armature from its starting position for disconnecting the positive terminal of the first exciter from the second terminal of the field winding and for connecting the negative terminal of the second exciter to the second terminal of the field winding to thus rapidly decrease the excitation of the field winding to a selected low value, and means for maintaining the field excitation at the selected low value until the motor armature has completed a selected angular motion.

5. In an electric system of control, in combination, a motor having a field winding excited at a selected value and having an armature, a generator having a field winding with characteristics such that the generator voltage may be built up rapidly when the generator field winding is excited, said generator having an armature connected in a loop circuit with the armature of the motor, an exciter for effecting rapid excitation of the generator field winding, a second exciter, said two exciters having their negative and positive armature terminals connected together and to one terminal of the generator field winding, means for connecting the positive terminal of the first exciter to the other terminal of the generator field winding to thus effect the starting and rapid acceleration of the motor, means responsive to a selected rise in generator voltage to decrease the effective voltage applied to the generator field winding, means responsive to a selected angular movement of the motor armature from its starting position for disconnecting the positive terminal of the first exciter from the second terminal of the field winding and for connecting the negative terminal of the second exciter to the second terminal of the field winding to thus rapidly decrease the excitation of the field winding to a selected low value, means for maintaining the field excitation at the selected low value until the motor armature has completed a selected angular motion, and locking means for stopping the motor at a selected angular position of the armature.

6. In an electric system of control, in combination, a motor having a field winding excited at a selected value and having an armature, a generator having a field winding with characteristics such that the generator voltage may be built up rapidly when the generator field winding is excited, said generator having an armature connected in a loop circuit with the armature of the motor, an exciter for effecting rapid excitation of the generator field winding, a second exciter, said two exciters having their negative and positive armature terminals connected together and to one terminal of the generator field winding, means for connecting the positive terminal of the first exciter to the other terminal of the generator field winding to thus effect the starting and rapid acceleration of the motor, means responsive to a selected rise in generator voltage to decrease the effective voltage applied to the generator field winding, means responsive to a selected angular movement of the motor armature from its starting position for disconnecting the positive terminal of the first exciter from the second terminal of the field winding and for connecting the negative terminal of the second exciter to the second terminal of the field winding to thus rapidly decrease the excitation of the field winding to a selected low value, means for maintaining the field excitation at the selected low value until the motor armature has completed a selected angular motion, locking means for stopping the motor at a selected angular position of the armature, and means operable at substantially the same instant as the operation of said locking means for killing the residual flux in the generator.

7. In an electric system of control, in combination, a motor and a generator having their armature windings connected in a loop circuit, whereby the motor is caused to operate in accordance with the voltage output of the generator, said generator having a first field winding designed to build up its excitation, when energized, in a relatively short interval of time, a second field winding for the generator, a first exciter, a second exciter, means for connecting the first exciter during a selected angular movement of the motor shaft to the first field winding to energize this field winding with a relatively high voltage, means effective to apply a lower voltage to the first field winding during a second selected angular movement of the motor armature shaft, means effective simultaneously to disconnect the first exciter from the first field winding and to connect the second exciter in a reverse voltage sense to the first field winding, means effective to so connect the second field winding to the second exciter to produce a flux effect in the same sense as the first field winding when connected to the first exciter, means effective to disconnect the second exciter from the first field winding after the motor armature shaft has rotated through a third selected angle of rotation, means for reversing the excitation of the second field winding after the motor armature shaft has been rotated through a fourth selected angle of rotation.

8. In an electric system of control for a generator, in combination, a generator having two field windings, a motor connected in a loop circuit with the generator, means for exciting the first field winding of the generator with a relatively high voltage and in one sense during a selected time period to accelerate the motor, means for exciting the first field winding at a lower voltage in the same sense during a second selected time period consecutive to the first time period to maintain the motor speed near constant, means for reversing the excitation voltage of the first field winding for a selected third time period consecutive to the second time period to rapidly decelerate the motor, means for initiating the excitation of the second field winding during the third time period, the excitation being in the same sense as the sense of the excitation of the first field winding during the first time period and being continued for a time period that extends beyond the third time period for a selected fourth time period to provide a creeping motor speed, and means for reversing the excitation of the second field winding for a short time interval after termination of the fourth time period to kill the residual flux and stop the motor.

9. In an electric system of control for an electric motor having its armature directly coupled to a load, means for supplying the motor with a voltage that varies at a relatively high rate from zero to a relatively high value in a selected time interval of such value to accelerate the motor from rest to full speed during a fraction of one rotation of the motor armature, means for decreasing the voltage supplied to the motor at a relatively low rate for a selected interval of time of such a value to produce a substantially constant motor speed during a successive fraction of said one rotation of the motor armature, and control means for decreasing the voltage supplied to the motor at a relatively high rate to a relatively low value during a third selected time interval of such magnitude to reduce the motor speed to a relatively low value during a third successive fractional portion of said one rotation of the motor armature.

10. In an electric system of control for an electric motor having its armature directly coupled to a load, means for supplying the motor with a voltage that varies at a relatively high rate from zero to a relatively high value in a selected time interval of such magnitude to accelerate the motor from rest to full speed during a fraction of one rotation of the motor armature, means for decreasing the voltage supplied to the motor at a relatively low rate for a selected interval of time of such magnitude to produce a substantially constant motor speed for a successive fraction of said one rotation of the motor armature, control means for decreasing the voltage supplied to the motor at a relatively high rate to a relatively low value during a third selected time interval of such magnitude to reduce the motor speed to a relatively low value during a third successive fractional portion of said one rotation of the motor armature, and means for maintaining the voltage at the said relatively low value to produce a constant creeping speed of the motor armature as it approaches the completion of said one complete turn.

11. In an electric system of control for an electric motor having its armature coupled directly to a load, means for supplying the motor with a voltage that varies at a relatively high rate from zero to a relatively high value in a selected time interval of such magnitude to accelerate the motor from rest to full speed during a fraction of one rotation of the motor armature, means for decreasing the voltage supplied to the motor at a relatively low rate for a selected interval of time of such magnitude to produce a substantially constant motor speed for a successive fraction of said one motor rotation, control means for decreasing the voltage supplied to the motor at a relatively high rate to a relatively low value during a third selected time interval of such magnitude to reduce the motor speed to a relatively low value during a third successive fractional portion of said one motor rotation, means for maintaining the voltage at the said relatively low value to produce a constant creeping speed of the motor armature as it approaches the completion of one complete turn, and means for reversing the relatively low voltage to kill the residual and stop the motor at the end of one rotation of the motor armature.

12. In an electric system of control for an electric motor having its armature coupled directly to a flying shear for cutting metal billets, or generally similar material supplied to the shear from a material processing machine as, for example, the last mill stand, in combination, a direct current motor excited at a selected constant value having its armature coupled directly to a load, as a flying shear, a main direct current generator having its armature connected in a loop circuit with the armature of the motor, said main generator having a first field winding and a second field winding, a pilot generator for producing a voltage proportional to the speed of the material to be sheared, an exciter, the first field winding of the main generator being designed, upon exitation, to very rapidly build up its flux and thus the voltage of the main generator, means responsive to the movement of the material to a selected position with respect to the flying shear for connecting the first field winding to the pilot generator, whereby the voltage of the main generator is caused to rise very rapidly to accelerate the motor from rest to full speed in somewhat less than one-half of a motor armature revolution, means responsive to the rise in voltage of the main generator in relation to the pilot generator voltage for so decreasing the excitation effect of the pilot generator on said first field winding to thus effect operation of the motor, for that fraction of said one motor armature revolution during which the flying shear makes its cut, at a speed that is in synchronism with the material speed, control means operable after the cut has been completed to disconnect the pilot generator from the first field winding and to connect the exiter, with opposite polarity, to the first field winding for a time interval of such magnitude to decelerate the motor to a creeping speed, and means for exciting the second field winding at a low value in the same sense as the excitation of the pilot generator on the first field winding to continue the creeping speed.

References Cited in the file of this patent

UNITED STATES PATENTS

| | | |
|---|---|---|
| 2,425,484 | Murrah | Aug. 12, 1947 |
| 2,546,024 | Wrathall | Mar. 20, 1951 |
| 2,634,811 | Schaelchlin | Apr. 14, 1953 |